J. W. S. GARDNER.
AUTOMATIC HEADLIGHT TURNING DEVICE.
APPLICATION FILED JAN. 12, 1914.
1,103,755.
Patented July 14, 1914.
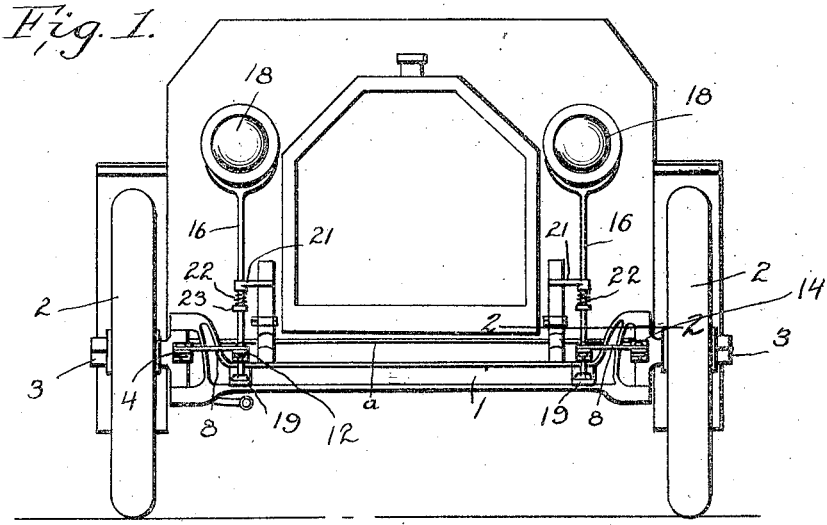
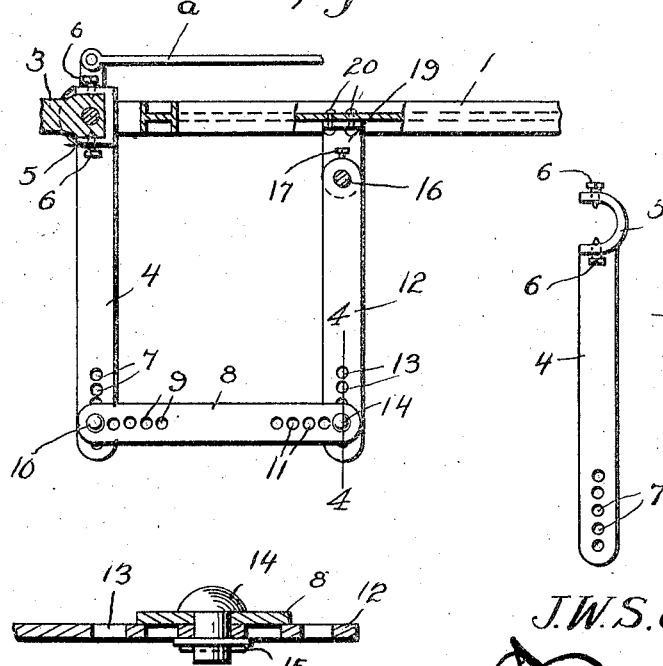
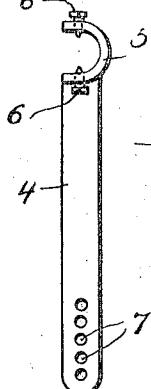
Inventor
J. W. S. Gardner.

UNITED STATES PATENT OFFICE.

JAMES WM. S. GARDNER, OF SAYLESVILLE, RHODE ISLAND.

AUTOMATIC HEADLIGHT-TURNING DEVICE.

1,103,755.  Specification of Letters Patent.  Patented July 14, 1914.

Application filed January 12, 1914. Serial No. 811,659.

*To all whom it may concern:*

Be it known that I, JAMES WILLIAM S. GARDNER, a citizen of the United States, residing at Saylesville, in the county of Providence and State of Rhode Island, have invented certain new and useful Improvements in Automatic Headlight-Turning Devices; and I do hereby declare the following to be a full, clear, and exact description of the invention, such as will enable others skilled in the art to which it appertains to make and use the same.

This invention relates to automatic headlight turning devices for automobiles and similar vehicles, and one of the principal objects of the invention is to provide simple, reliable and efficient means for turning the light in the direction of travel of the automobile, automatically in turning corners or rounding curves.

Another object of the invention is to provide a device of simple construction which may be attached to any automobile or similar vehicle and which can be adjusted to turn the light more or less in rounding curves or turning corners.

These and other objects may be attained by means of the construction illustrated in the accompanying drawings, in which—

Figure 1 is a front elevation of an automobile, having an automatic headlight turning device connected thereto and made in accordance with this invention. Fig. 2 is a sectional detail view taken on the line 2—2 of Fig. 1 and made on an enlarged scale. Fig. 3 is a detail view of the bar or member which is connected to the spindle or steering knuckle. Fig. 4 is a detail sectional view taken on the line 4—4 of Fig. 2.

Referring to the drawings, the numeral 1 designates the axle of an automobile and 2 are the wheels mounted on the pivoted spindles 3. These parts of the automobile may be of the usual or any suitable type.

A bar 4, provided with a U-shaped integral clip 5 is connected to the spindle 3 or steering knuckle of the front axle by means of set screws 6. The front end of the bar 4 is provided with a series of perforations 7. A cross bar 8, provided with a series of perforations 9, is adjustably connected to the bar 4 by means of a pin 10, which extends through any of the perforations 9 in the bar 8 and any of the perforations 7 in the bar 4. At the opposite end of the bar 8, a series of perforations 11 is provided. A bar 12, provided with a series of perforations 13, is connected to the bar 8 by means of a pin 14, similar to the pin 10, and provided with a cotter pin 15 for holding said pin in place.

The headlight standards 16 each extends through the bar 12 at their lower ends and are held in place by means of a set screw 17. The headlights 18 are mounted in yokes at the top of the standards 16. Secured to the axle 1 are brackets 19, each having a socket in which the lower end of the standard 16 is pivoted, said brackets being secured to the axle 1 by means of rivets or other suitable fastenings 20. A supporting bracket 21 is connected to any stationary part of the automobile, and the standards 16 extend through these brackets. A spiral spring 22 encircles the standard 16. At its lower end the spring is supported upon an adjustable nut or washer 23.

From the foregoing it will be obvious that this invention is extremely simple in construction, can be applied to any automobile, without changes in construction of the parts, can be adjusted to turn the headlights more or less in rounding curves or turning corners, and that the spring 22 will hold the standards 16 down in the sockets in the brackets 19. It will be understood that the turning devices are connected to each of the steering knuckles or spindles of the front wheels, and that the rod a, when actuated for steering the machine, will operate the headlights and throw them in the line of travel of the automobile.

What is claimed is:—

In a device of the character described, a member having a U-shaped integral clip, means for connecting the said clip to a steering knuckle, said member having a series of perforations at its outer end, a cross bar provided with perforations at its opposite ends, means for connecting one end of said cross bar adjustably to the first named member, a member adjustably connected to the opposite end of said cross bar, means for supporting the headlight standard in said member, a bracket having a socket for supporting the lower end of the headlight standard, and a spring for holding said standard in the socket.

In testimony whereof I affix my signature in presence of two witnesses.

JAMES WM. S. GARDNER.

Witnesses:
WILLIAM M. PEACOCK,
CLARENCE N. WOOLLEY.